United States Patent [19]
Kojima

[11] Patent Number: 5,438,608
[45] Date of Patent: Aug. 1, 1995

[54] MOBILE RADIO COMMUNICATION SYSTEM HAVING BASE STATIONS AND RADIO TERMINALS EACH HAVING TENANT IDENTIFICATION DATA STORAGE FOR STORING TENANT ID DATA

[75] Inventor: Susumu Kojima, Tokyo, Japan

[73] Assignee: NEC Corporation, Tokyo, Japan

[21] Appl. No.: 213,455

[22] Filed: Mar. 14, 1994

Related U.S. Application Data

[63] Continuation of Ser. No. 873,227, Apr. 24, 1992, abandoned.

[30] Foreign Application Priority Data

Apr. 24, 1991 [JP] Japan .................. 3-122581

[51] Int. Cl.⁶ ........................................... H04Q 7/38
[52] U.S. Cl. ........................................ 379/58; 379/59; 379/62; 455/33.2; 455/56.1
[58] Field of Search ............. 370/95.1; 379/56, 58, 379/60, 62, 59; 455/33.1, 33.4, 33.2, 56.1

[56] References Cited

U.S. PATENT DOCUMENTS

| | | | |
|---|---|---|---|
| 4,467,141 | 8/1984 | Resch et al. | 379/62 |
| 4,833,702 | 5/1989 | Shitara et al. | 379/60 |
| 4,852,148 | 7/1989 | Shibata et al. | 379/59 |
| 4,881,271 | 11/1989 | Yamauchi et al. | 455/56.1 |
| 5,020,094 | 5/1991 | Rash et al. | 379/62 |

FOREIGN PATENT DOCUMENTS

| | | |
|---|---|---|
| 0344989 | 12/1989 | European Pat. Off. . |
| 0388034 | 9/1990 | European Pat. Off. . |
| 3738829 | 5/1989 | Germany . |
| 0317035 | 12/1989 | Japan .................. 455/33.2 |
| 3219795 | 9/1991 | Japan .................. 379/58 |
| 2166622 | 5/1986 | United Kingdom . |

OTHER PUBLICATIONS

Patent Abstracts of Japan, vol. 15, No. 502, 18 Dec. 1991.

Primary Examiner—Curtis Kuntz
Assistant Examiner—William Cumming
Attorney, Agent, or Firm—Sughrue, Mion, Zinn, Macpeak & Seas

[57] ABSTRACT

A cordless telephone system or similar mobile radio communication system which limits the service available for a mobile unit or radio terminal in an exclusive zone assigned to the terminal and removes the limitation in a common zone while opening all the zones to a particular radio terminal. Assuming a single building accommodating a plurality of companies, the area where radio terminals can be serviced is limited on a companay basis. All the terminals belonging to the respective companies are serviced at a restaurant, lobby or similar common space inside the building. An exclusive terminal for a guard, for example, is serviced in all the arears inside the building.

3 Claims, 7 Drawing Sheets

| BIT SYNC | FRAME SYNC | SIGNAL DISCRIMINATION | DATA | CHECK BIT |

- SYSTEM ID DATA
- ZONE ID DATA
- TERMINAL ID DATA
- TENANT ID DATA

| TENANT ID DATA | TERMINAL 3 | BASE STATION 2 |
|---|---|---|
| 0 | X1 | 24 |
| 1 | A1, A2, A3, A4, A5, A6, A7 | 20, 21 |
| 2 | B1, B2, B3 | 22 |
| 3 | C1, C2, C3 | 23 |

MOBILE RADIO COMMUNICATION SYSTEM HAVING BASE STATIONS AND RADIO TERMINALS EACH HAVING TENANT IDENTIFICATION DATA STORAGE FOR STORING TENANT ID DATA

This is a Continuation of application Ser. No. 07/873,227 filed Apr. 24, 1992 now abandoned.

BACKGROUND OF THE INVENTION

The present invention relates to a cordless telephone system or similar mobile radio communication system which limits the service available for a radio terminal in an exclusive zone allocated to the terminal and removes the limitation in a common zone while opening all the zones to a particular radio terminal.

The installation of a cordless telephone system in offices is spreading. A service area covering an office is usually wider than one covering a home, it is divided into a plurality of radio zones. In this kind of system, a particular zone identification (ID) signal is assigned to each radio zone together with a common system ID code. The zones where individual radio terminals are positioned are registered to control the correspondence between the zone ID codes and terminal ID codes. Each terminal, therefore, can be serviced with no regard to the location so long as it lies in the service area. However, assuming a single building accommodating a plurality of tenants, e.g., companies, charges and user rights have to be taken into account. Then, it is necessary to limit the service area where a radio terminal can be used on a company basis. Should all the radio terminals belonging to the system be used in any place inside the building, a radio base station assigned to a certain company might be used illicitly by radio terminals belonging to the other companies. On the other hand, when the service area available for a company is limited on a floor basis, radio terminals owned by a company cannot be used in a common space inside the building, e.g., restaurant or lobby. Further, such a configuration limits even the service area available for a radio terminal used by, for example, a guard inside the building despite the fact that the role of such a particular terminal should be shared by all the other terminals.

SUMMARY OF THE INVENTION

It is therefore an object of the present invention to provide a cordless telephone system or similar mobile radio communication system which limits the service area on a company basis and, in addition, opens a particular zone to all the radio terminals while allowing a particular radio terminal to be used any zone.

In accordance with the present invention, in a mobile radio communication system having a service area divided into a plurality of radio zones and comprising a radio base station assigned to each of the radio zones and connected to a line controller connected to subscriber lines which extend from a public switched telephone network, and a .plurality of radio terminals connectabel to the radio base station over a radio channel, the radio base station and radio terminals each comprises a tenant identification (ID) data storage for storing tenant ID data. The radio terminals each comprise a tenant ID data transmitting section for transmitting, before the radio channel is set up, the tenant ID data read out of the tenant ID data storing section to the radio base station. The radio base station comprises a radio channel connecting section for comparing the received tenant ID data with the tenant ID data assigned to the radio base station and, if the two tenant ID data are identical, setting up the radio channel.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
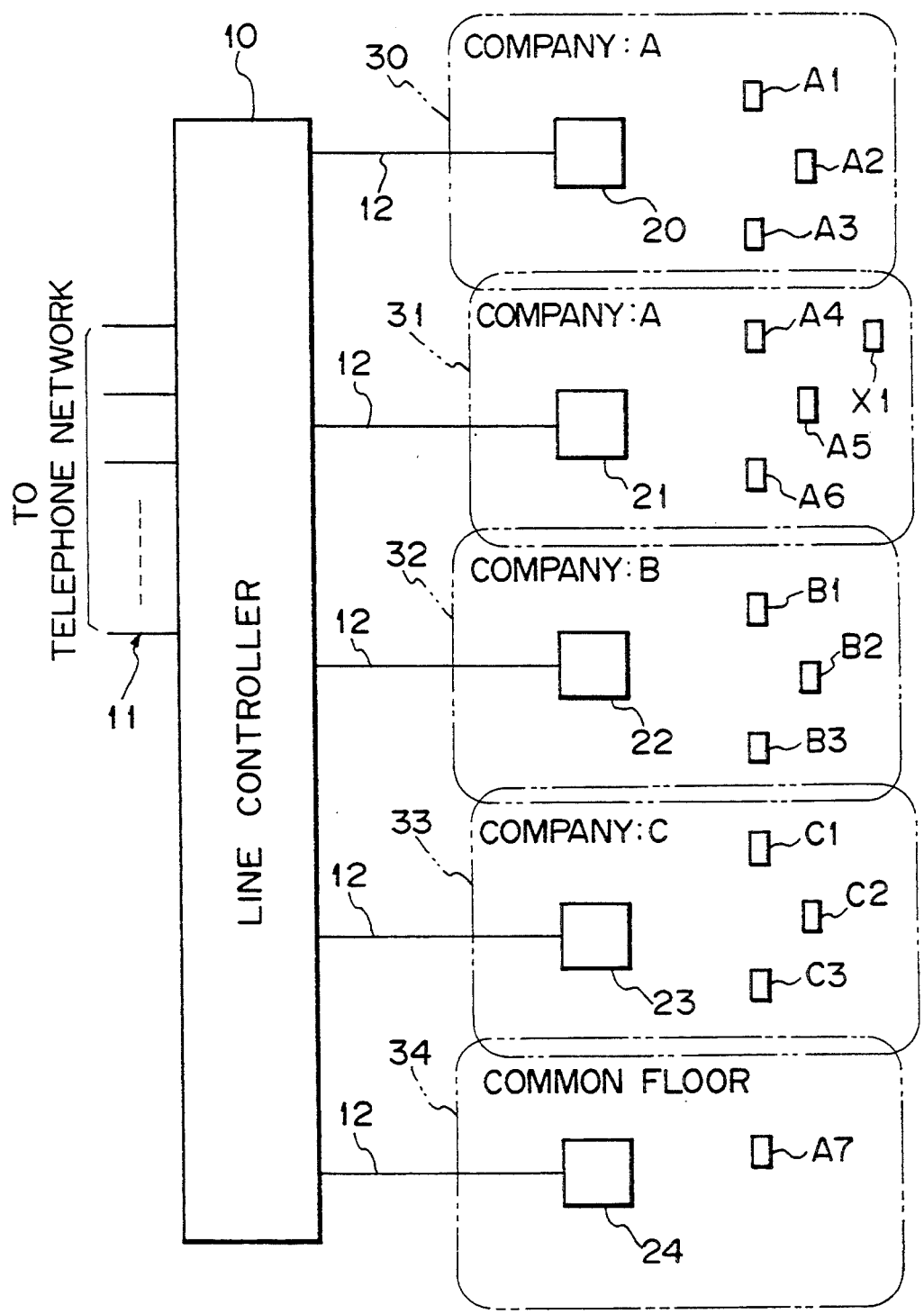
FIG. 1 is a block diagram schematically showing a mobile radio communication system embodying the present invention.

Referring to FIG. 1 of the drawings, a mobile radio communication system embodying the present invention is shown and implemented as a cordless telephone system by way of example. As shown, the cordless telephone system has a service area divided into a plurality of, e.g., five radio zones 30, 31, 32, 33 and 34. Assume that the radio zones 30, 31, 32, 33 and 34 are accommodated in a five-story building and respectively assigned to the first and second floors occupied by a company A, the third floor occupied by a company B, the fourth floor occupied by a company C, and the fifth floor on which a restaurant or similar common facility to be shared by the companies A-C is. Each of the floors has an area which can be covered by a single radio base station. Specifically, radio base stations 20, 21, 22, 23 and 24 are respectively situated on the first to fifth floors to define the radio zones 30-34. A line controller 10 is connected to a public switched telephone network by subscriber lines 11 and connected to the radio base stations 20-24 by tie lines 12. Mobile units or radio terminals A1-A7, radio terminals B1-B3, and radio terminals C1-C3 belong to the companies A, B and C, respectively. A radio terminal X1 is allocated to a guard stationed at the building. In the specific condition shown in the FIGURE, the terminal A7 belonging to the company A is positioned at the common space or restaurant on the fourth floor, the terminal X1 is located at a guard's room on the second floor, and the other terminals are positioned on the floors belonging to the respective companies. Since the radio zones 30-34 have an identical arrangement, let the following description concentrate on the radio zone 30 by way of example.

Figure 2:
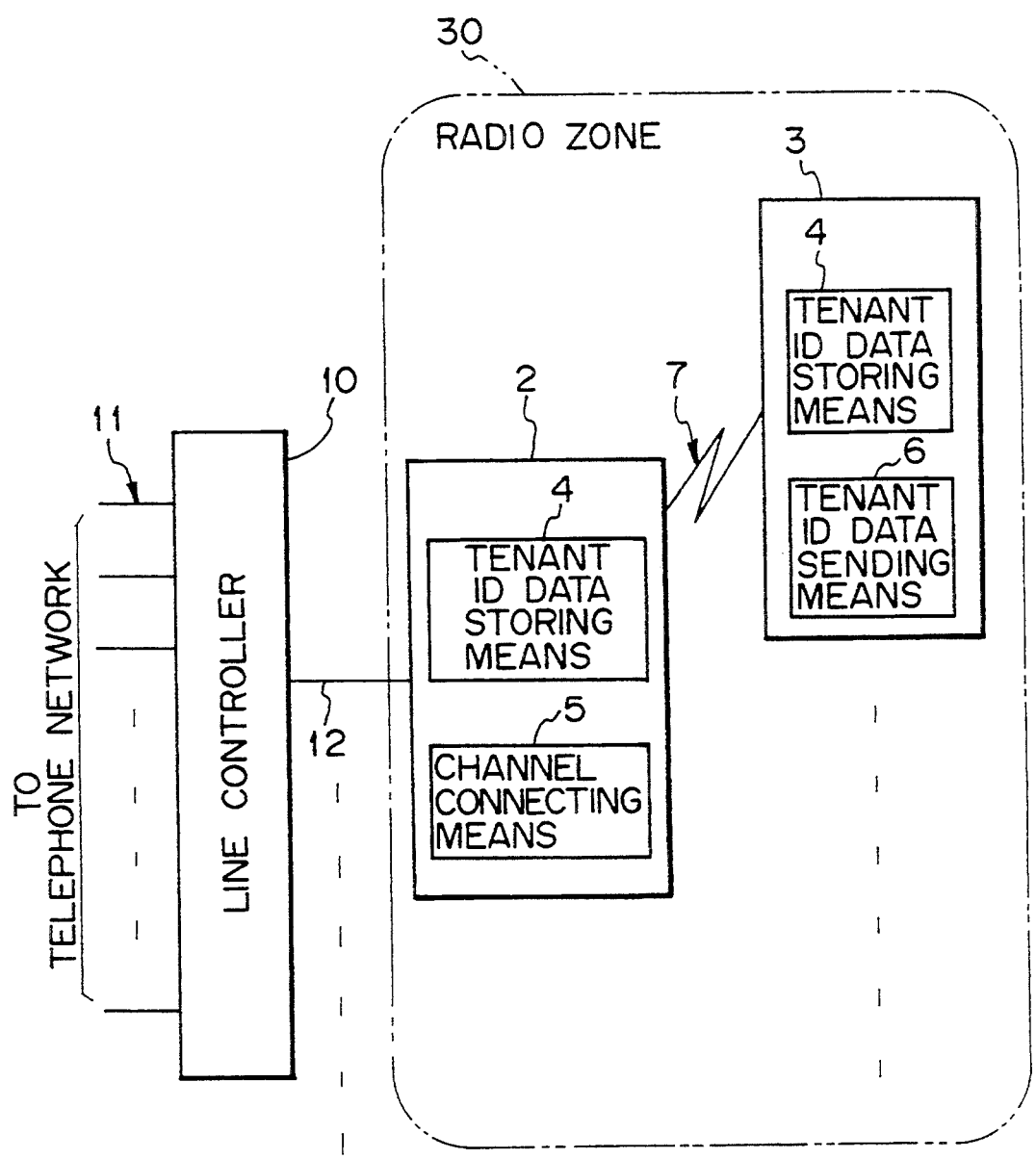
FIG. 2 is a block diagram schematically showing the arrangement of each radio zone included in the embodiment.

As shown in FIG. 2, the radio zone 30 has a radio base station 2 connected to the line controller 10 by the tie line 12, and a plurality of mobile units or radio terminals 3 connectable to the base station over a radio channel 7. The base station 2 and terminals 3 each includes tenant identification (ID) data storing means 4 storing data which identifies the associated tenant. Each terminal 3 has tenant ID sending means 6 for sending, before the radio channel 7 is set up, the tenant ID data read out of the storing means 4 to the base station 2. The base station 2 has channel connecting means 5 for comparing the tenant ID data sent from any one of the terminals 3 over the radio channel with the tenant ID data stored in the storing means 4 thereof and, if the former is coincident with the latter, setting up the radio channel 7. The base station 2 further includes means for executing control when the tenant ID data sent from the terminal 3 has a first predetermined value by determining that the two ID data are identical, and means for executing control when the tenant ID data stored in its own tenant ID data storing means 4 has a second predetermined value by determining that the two ID data are identical.

Figure 3:
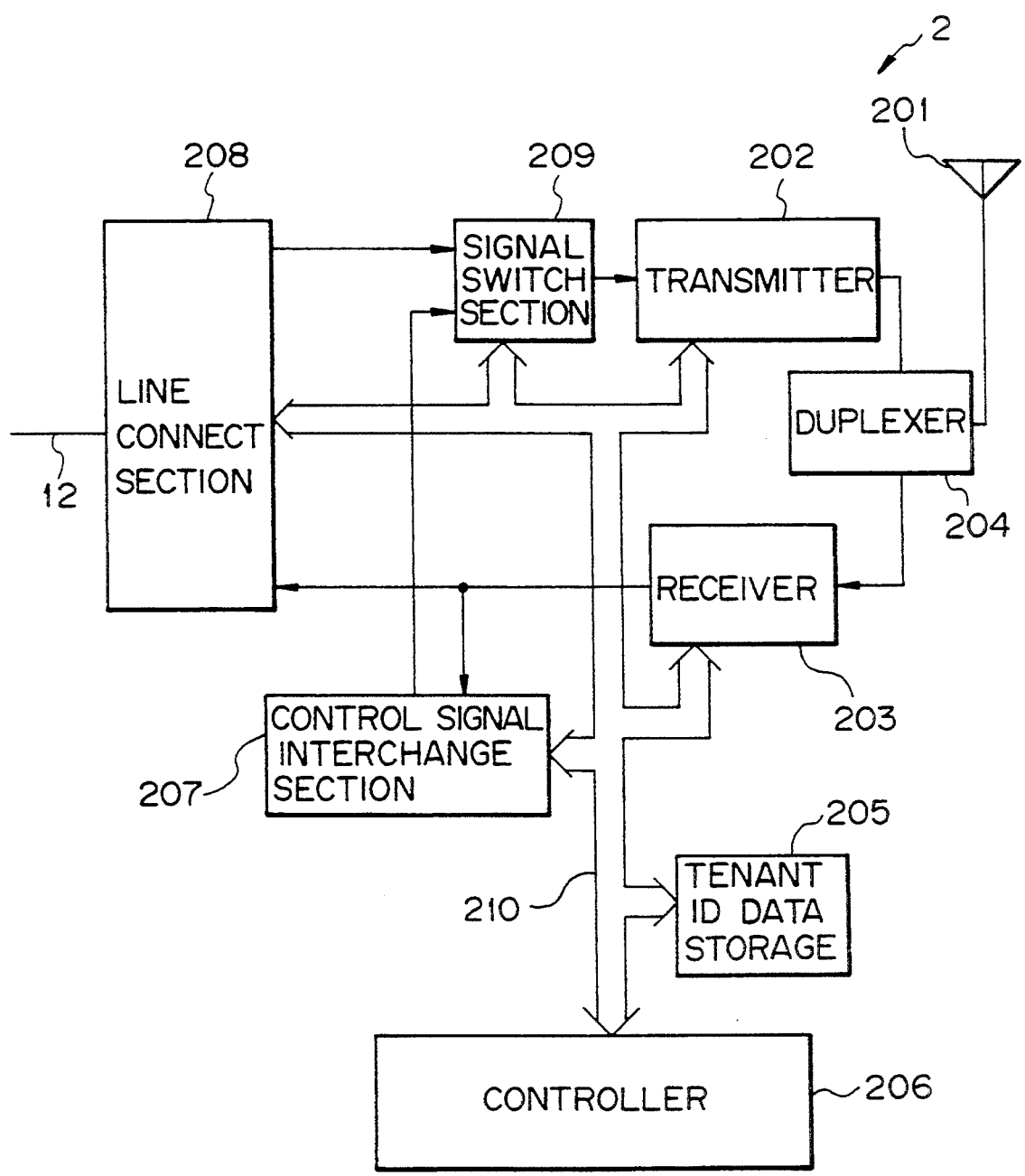
FIG. 3 is a block diagram schematically showing a specific construction of each radio base station of the embodiment.

Referring to FIG. 3, a specific construction of the base station 2 will be described. As shown, the base station 2 has an antenna 201, a transmitter 202, a receiver 203, an antenna duplexer 204, a tenant ID data storage 205, a controller 206, a control signal interchanging section 207, a line connecting section 208, and a signal switching section 209. The controller 206 controls the constituents of the base station 2 over a control bus 210. The base station 2 is connected to the line controller 10 via the line connecting section 208 and tie line 12. While a conversation is under way, a voice signal from the line controller 10 is delivered to the transmitter 202 via the line connecting section 208 and signal switching section 202. In response, the transmitter 202 modulates a carrier by the voice signal while sending the resulting signal to the terminal 3 of interest via the duplexer 204, and antenna 201. A voice signal received from the terminal 3 via the antenna 201 and duplexer 204 is demodulated by the receiver 203 and then fed to the line controller 10 via the line connecting section 208. On the other hand, in a standby state, the line controller 206 constantly monitors the control signal interchanging section 207 and line connecting section 208 to see if a connection request signal has been received from the terminal 3 and if a call has been terminated from the line controller 10. On receiving a connection request signal from the terminal 3, the base station 2 reads the ID data assigned to the tenant out of the tenant ID data storage 205 and compares it with the tenant ID data included in the signal sent from the terminal 3. If the two ID data are identical, the base station 2 sends a channel designation signal to the terminal 3 by controlling the control signal interchanging section 207 and signal switching section 209. If otherwise, the base station 2 rejects the connection request signal.

Figure 4:
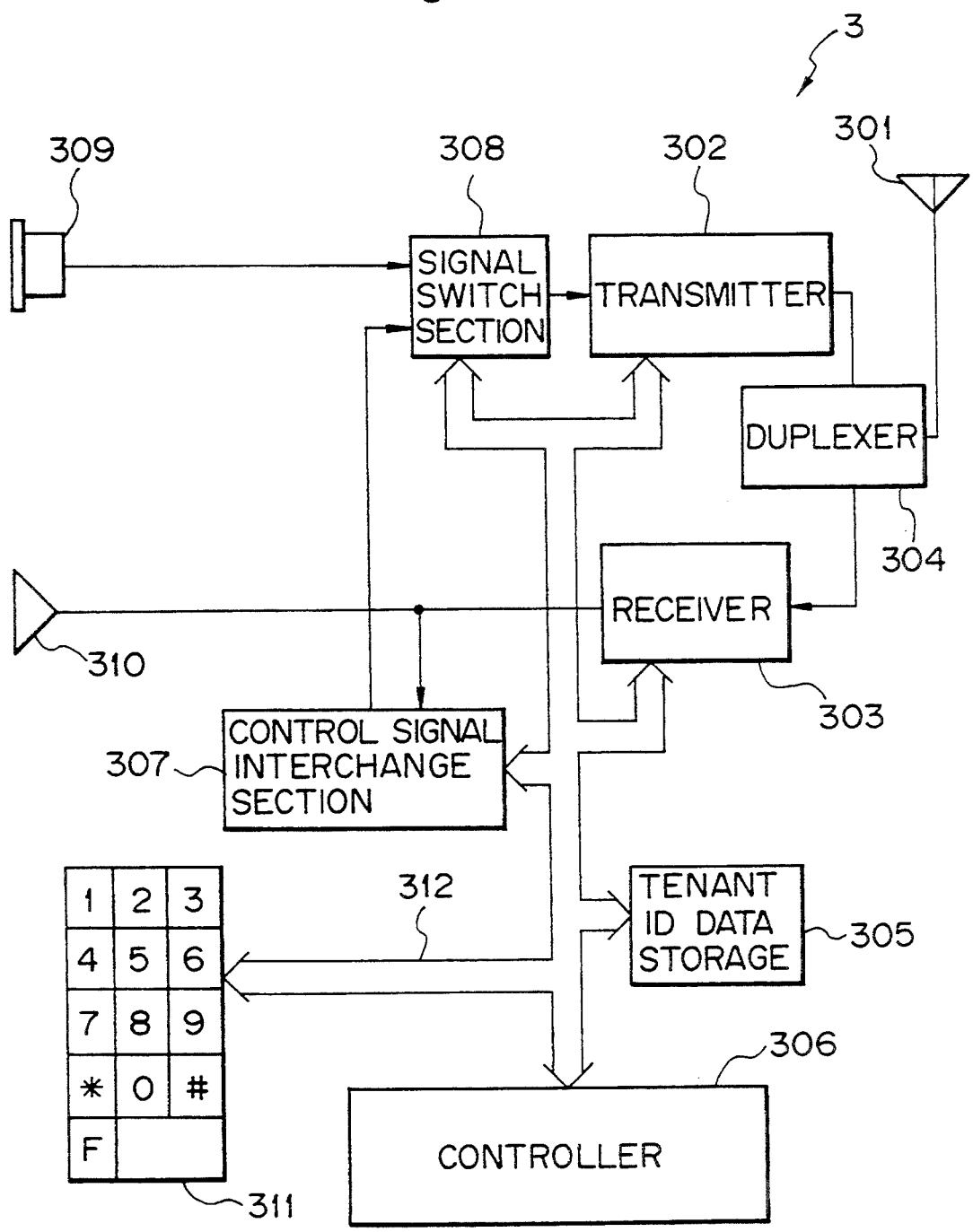
FIG. 4 is a block diagram schematically showing a specific construction of each radio terminal of the embodiment.

FIG. 4 shows a specific construction of the mobile unit or radio terminal 3. As shown, the terminal 3 has an antenna 301, a transmitter 302, a receiver 303, an antenna duplexer 304, a tenant ID data storage 305, a controller 306, a control signal interchanging section 307, a signal switching section 308, a mouthpiece 309, an earpiece 310, and keys 311 consisting of numeral keys and function keys. The controller 306 controls the various parts of the terminal 3 over a control bus 312. While a conversation is held on the terminal 3, a voice signal is received from the base station 2 via the antenna 301 and duplexer 304, demodulated by the receiver 303, and fed to the earpiece 310. A voice signal from the mouthpiece 309 is applied to the transmitter 302 via the signal switching section 308. In response, the transmitter 302 modulates a carrier by the voice signal while sending the resulting signal to the base station 2 via the duplexer 304 and antenna 301. In a standby state, the controller 306 constantly checks the control signal interchanging section 307 and keys 311 to see if a call signal has been received from the base station 2 and if the keys 311 have been operated for originating a call. On detecting a call originating operation on the keys 311, the controller 306 reads the tenant ID data assigned to the tenant out of the tenant ID storage 305, formats it in a connection request signal, and sends the resulting signal to the base station 2 by controlling the control signal interchanging section 307 and signal switching section 308.

Figure 5:
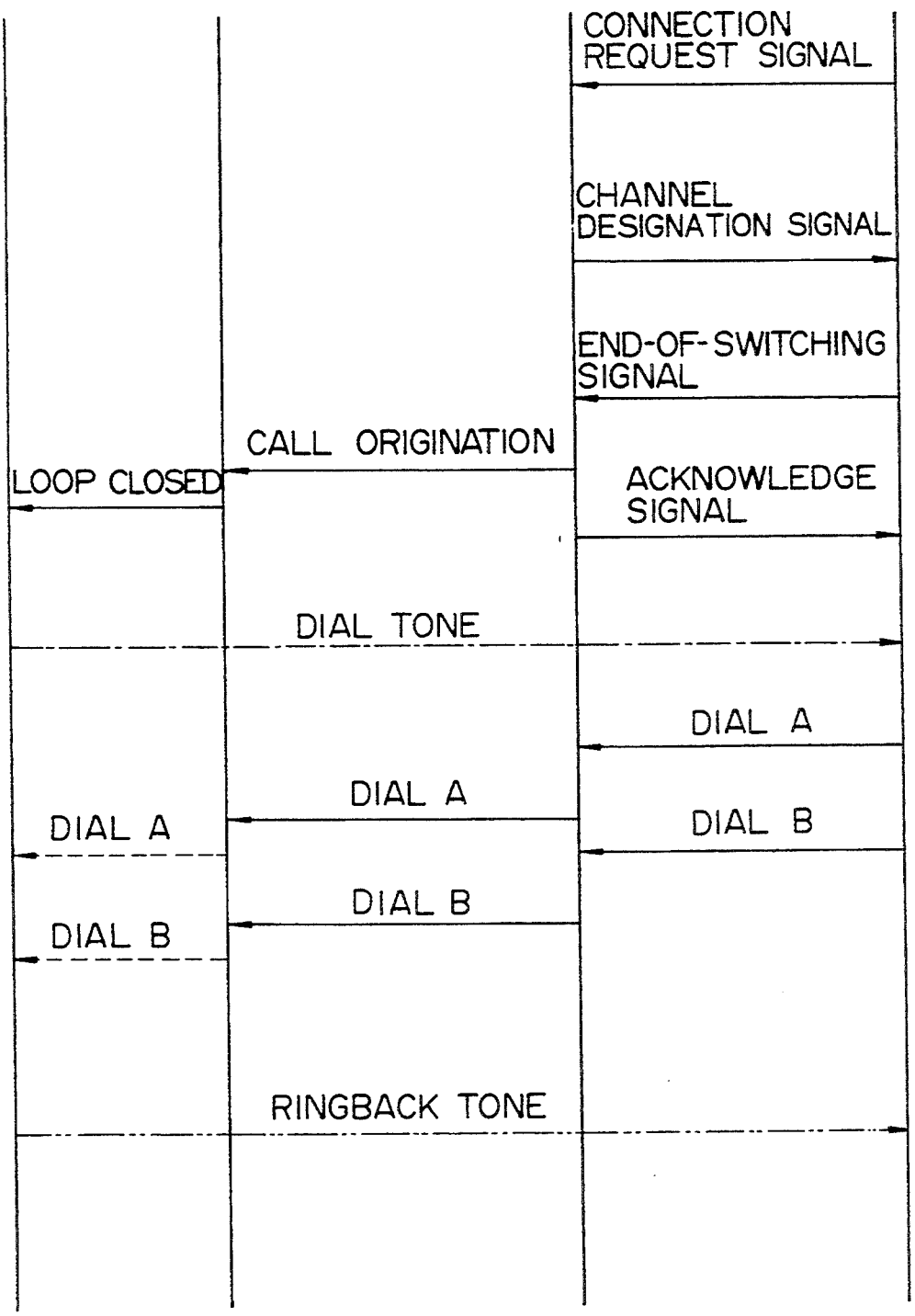
FIG. 5 is a diagram representative of a connection sequence in which a call is originated on any of the radio terminals.

FIG. 5 shows a connection sequence to be executed when a call is originated on the radio terminal 3. Connection control and conversation are implemented by a radio control channel and a radio voice channel, respectively. The connection request signal which the terminal 3 sends first and the channel designation signal which the base station 2 returns on receiving the connection request signal are transmitted and received in bursts over the control channel. In the other radio sections, signals are interchanged over the voice channel specified by the channel designation signal.

Figures 6, 7:
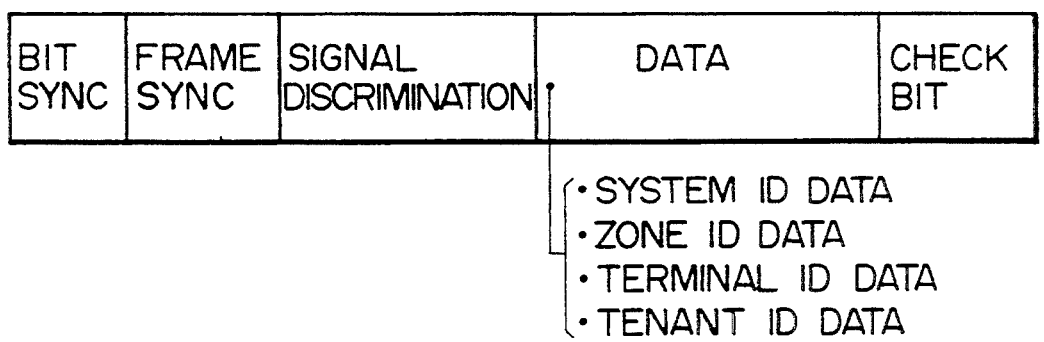
FIG. 6 shows a specific format of tenant ID data particular to the embodiment.
FIG. 7 lists tenant ID data each being assigned to respective one of radio terminals and radio base stations.

FIG. 6 shows a specific format of the tenant ID data to be sent from the terminal 3 to the base station 2. As shown, the format has a bit synchronization (SYNC) field at the leading end thereof and a frame SYNC field, signal discrimination field and a data field which sequentially follow the bit SYNC field. The data field includes system ID data, zone ID data, terminal ID data, and tenant ID data. All the ID data except for the zone ID data are particular fixed data stored in each of the terminals 3, while the zone ID data identifies a zone where the terminal 3 has the position thereof registered and, therefore, it is updated every time the terminal 3 moves from one zone to another. The connection request signal shown in FIG. 5 is sent from the terminal 3 in the format shown in FIG. 6. The base station 2 compares the tenant ID data included in the connection request signal with the tenant ID data stored therein.

Figure 8:
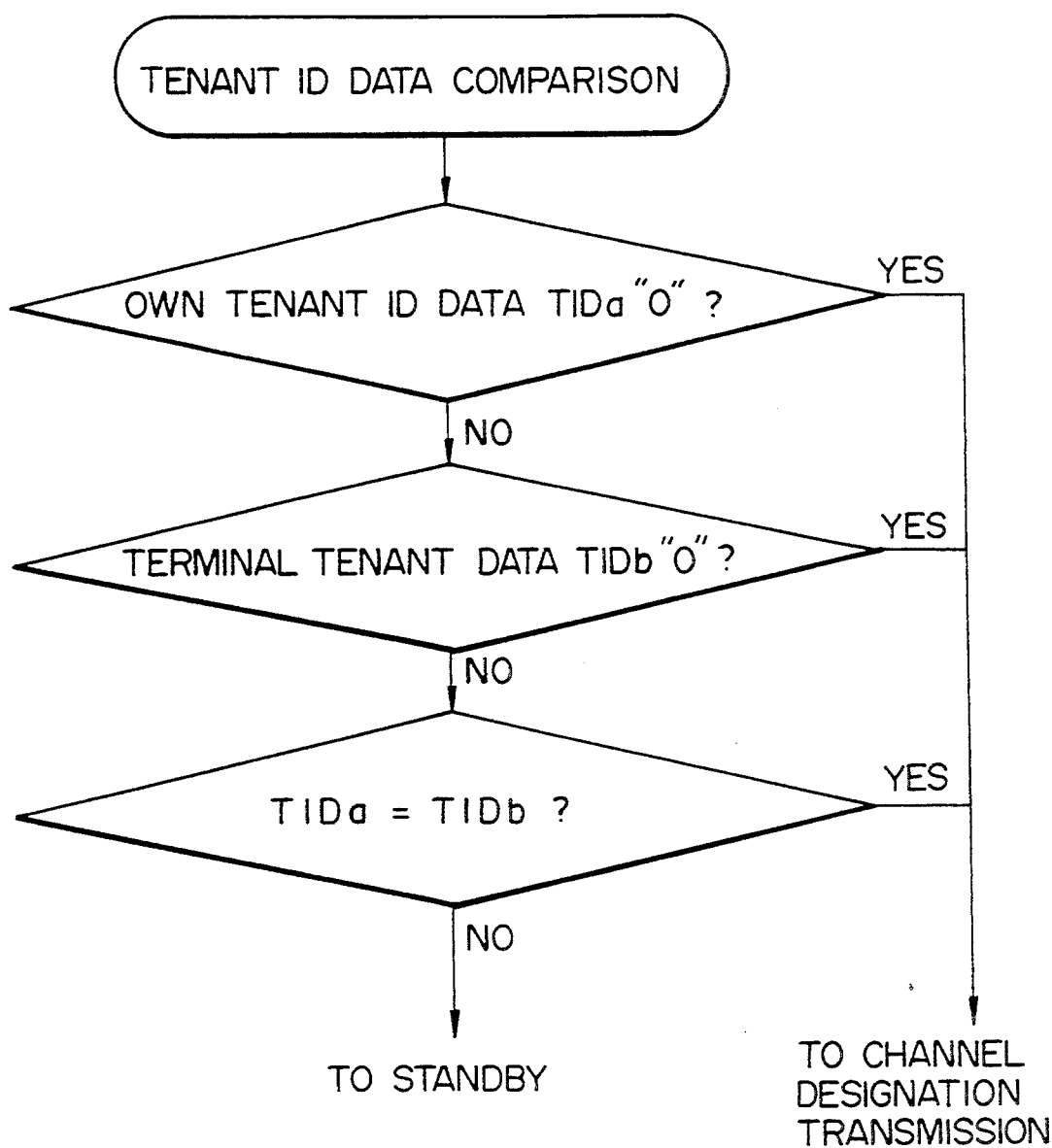
FIG. 8 is a flowchart demonstrating a specific procedure for comparing the tenant ID data.

FIG. 7 lists specific tenant ID codes each being assigned to respective one of the radio terminals 3 and radio base stations 2. FIG. 8 demonstrates a specific procedure for comparing the tenant ID data. In the embodiment, the base station 2 to which the tenant ID code "0" is assigned designates a channel in response to a connection requests from every terminal 3, while every base station 2 designates a channel in response to a connection request from a particular terminal 3 to which the tenant ID code "0" is assigned. Stated another way, every base station 2 handles the tenant ID code "0" in the same way with no regard to the result of comparison. For example, all the terminals A1–A6, B1–B3 and C1–C3 belonging to the respective companies can be serviced at the common floor where the base station 24, FIG. 1, is situated, and the terminal X2 located at the guard's room can be serviced on all the floors of the builting.

In summary, it will be seen that the present invention provides a mobile radio communication system which, assuming a single building accommodating a plurality of companies, limits the area where radio terminals can be serviced on a company basis, allows all the terminals belonging to respective companies to be serviced at a restaurant, lobby or similar common space, and allows an exclusive terminal for a guard, for example, to be serviced in all the arears inside the building.

Various modifications will become possible for those skilled in the art after receiving the teachings of the present disclosure without departing from the scope thereof.

What is claimed is:

1. A mobile radio communication system having a service area divided into a plurality of radio zones and comprising a radio base station assigned to each of said plurality of radio zones, each of said radio base stations being connected to a line controller which is connected to subscriber lines which extend from a public switched telephone network, and a plurality of radio terminals which are connected to said radio base stations over a radio channel, said radio base stations each comprising first tenant identification (ID) data storing means for storing first tenant ID data, said first tenant ID data indicating at least one service group of said radio terminals, and said radio terminals each comprising second tenant ID data storing means for storing second tenant ID data, said second tenant ID data indicating a particular one of said service groups to which the radio terminals belong;

said radio terminals each comprising tenant ID data transmitting means for transmitting, before a connection of a radio channel is set up, the second tenant ID data, read out of said second tenant ID data storing means, to said radio base station;

each of said radio base stations comprising radio channel connecting means for comparing the second tenant ID data received from said tenant ID data transmitting means of a particular one of said radio terminals with the first tenant ID data stored in said first tenant ID data storing means thereof and, if the first and second tenant ID data are identical, said radio channel connecting means causes a setting means to set up a connection of the radio channel between an associated one of said base stations and a particular one of said radio terminals, if the first and second tenant ID data are not identical, said radio channel connecting means prohibits a connection of the radio channel between the associated one of said base stations and the particular one of said radio terminals.

2. A mobile radio communication system as claimed in claim 1, further comprising:

first executing means for causing said setting means to set up a radio channel connection if the second tenant ID data received from one of said second tenant ID data storing means of said radio terminals has a first predetermined value; and second executing means for causing said setting means to set up a radio channel connection if the first tenant ID data stored in said first tenant identification data storing means associated with said radio base station has a second value.

3. A system as claimed in claim 1 wherein one common control channel is serviced for each of said radio terminals.

* * * * *

UNITED STATES PATENT AND TRADEMARK OFFICE
CERTIFICATE OF CORRECTION

PATENT NO. : 5,438,608
DATED : August 1, 1995
INVENTOR(S) : Susumu Kojima

It is certified that error appears in the above-indentified patent and that said Letters Patent is hereby corrected as shown below:

Abstract, line 13 delete "arears", insert --areas--

Column 1, lines 61 & 62 delete "connectabel", insert --conectable--

Column 4, line 64 delete "builting", insert --building--

Column 5, line 5 delete "arears", insert --areas--

Signed and Sealed this

Twentieth Day of February, 1996

Attest:

BRUCE LEHMAN

Attesting Officer

Commissioner of Patents and Trademarks